INVENTOR.
Engelbert A. Meyer
BY George A. Schmidt
ATTORNEY

United States Patent Office 3,107,939
Patented Oct. 22, 1963

3,107,939
MOLDING FASTENER
Engelbert A. Meyer, Union Lake, Mich., assignor to General Motors Corporation, Detroit, Mich., a corporation of Delaware
Filed July 20, 1961, Ser. No. 125,456
4 Claims. (Cl. 296—93)

This invention relates to molding fasteners, and more particularly to a two-piece molding fastener for securing a molding strip to a flanged support.

In the design and manufacture of motor vehicles it is often desirable to secure an ornamental molding strip around a windshield or the like, or in some other location where the molding strip overlies a flanged support. A typical installation is the ornamental molding strip surrounding a rear windshield which engages both the supporting panel and the usual rubber weatherstrip device. This molding strip is commonly called a "reveal" molding. The weatherstrip and windshield are located adjacent a suitable flange attached to, or formed from, the supporting panel which surrounds the windshield opening.

Numerous problems present themselves in such an installation, and most particularly in providing a secure, positive and weathertight installation. The fastening devices presently available are complicated and cumbersome fasteners which are expensive to manufacture and inconvenient to assemble. Special tools are often required to mount the fastening devices and the ornamental strips, making the assembly procedure extremely expensive and time consuming.

The device in which this invention is embodied comprises, generally, a two-piece fastening device, one piece of which is secured over the flange and the other piece of which is placed in the ornamental molding strip. The molding strip and the fastener part secured therein is easily installed on the motor vehicle and in the secured portion of the fastening device by simply pushing the strip toward the panel and windshield. The assembly is thus extremely simplified and no special tools are required. The stationary portion of the fastening device is provided with a reversely bent terminal edge which bites into the movable portion of the fastening device to prevent unauthorized removal. The resultant fastening is positive and secure against unauthorized removal.

With a device of this nature the assembly procedure is extremely simple and inexpensive, and the installation may be made by unskilled personnel with a minimum of time and effort. This permits greater saving in the production of the assembly and at a great cost saving to the manufacturer.

These and other advantages will become more apparent from the following description and drawing, in which:

FIGURE 3 is taken substantially along the line 3—3 of FIGURE 1, looking in the direction of the arrows.

Figure 1:
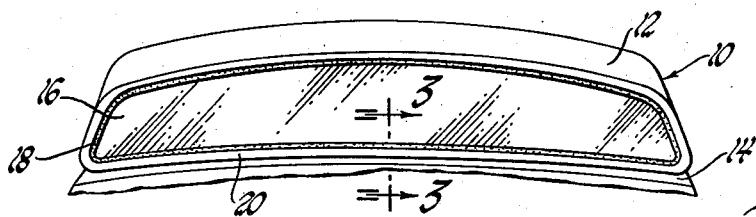
FIGURE 1 is a view of a portion of a motor vehicle illustrating the position of the rear window and the ornamental molding strip.
Figure 2:
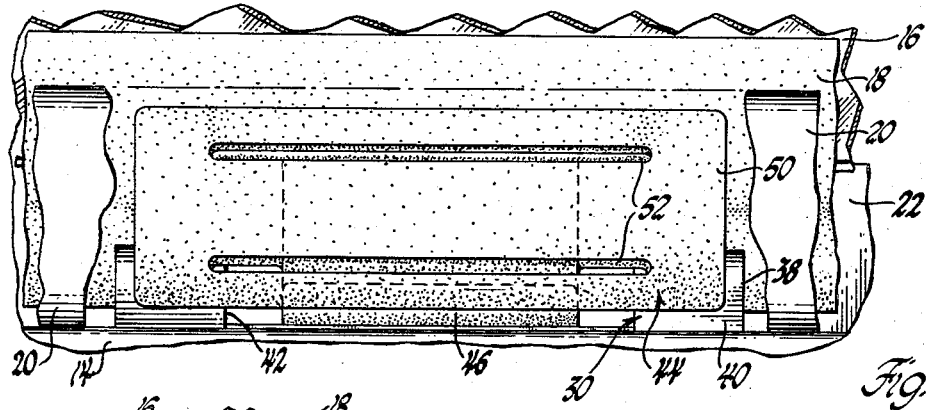
FIGURE 2 is an enlarged view of a portion of FIGURE 1 with parts broken away to illustrate the position of the various parts of the assembly.

Referring more particularly to the drawing, FIGURE 1 best illustrates the position of an ornamental molding or the like on an assembly such as a motor vehicle. In FIGURE 1 a vehicle, illustrated generally by the numeral 10, is provided with a roof panel 12 and a deck lid panel 14. A suitable window 16 is provided between the two. Surrounding the window 16 and properly seating the window in the body 10 is a conventional weatherstrip 18 which extends around the periphery of the window 16. An ornamental molding strip 20, of a suitable cross-sectional configuration, is disposed about the window 16 and engages the body panels 12 and 14 and the weatherstrip 18 in a manner to be later described.

The deck lid panel 14 may be provided with an upstanding integral flange, or a flange, as 22, may be provided by welding or otherwise securing a separate piece 24 to the panel 14. Regardless of the construction, it is necessary in the vehicle design to provide a flange 22 adjacent the window 16 and which is generally parallel to the window 16. Flange 22 supports the weatherstrip 18 in a conventional and well known manner.

Figure 3:
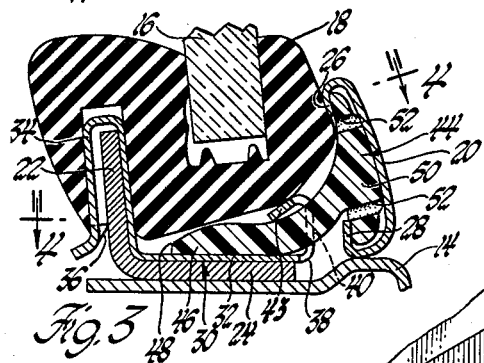
FIGURE 3 is a cross-sectional view of a portion of the structure of FIGURE 1 illustrating the position of the various parts of the assembly.
Figure 4:
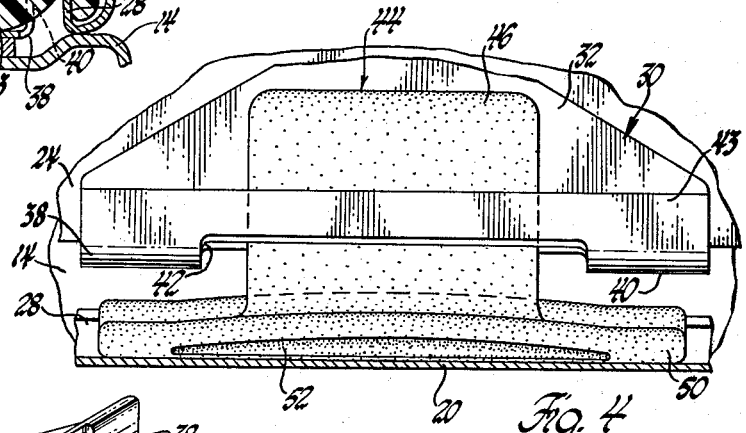
FIGURE 4 is a plan view of a portion of the structure of FIGURE 1 taken substantially along the line 4—4 of FIGURE 3 and looking in the direction of the arrows.
Figure 5:
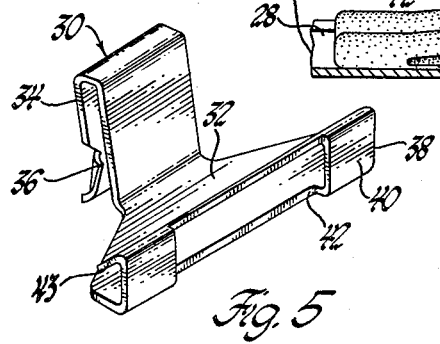
FIGURE 5 is an isometric view of the stationary portion of the fastening device.

As seen in FIGURE 3, the molding strip 20, which is provided with longitudinal lips or flanges 26 and 28, is adapted to cover the opening between the weatherstrip 18 and the panel 14.

The fastening device for securing molding strip 20 to the support 14 is formed of two separate parts. As seen in FIGURE 3, an anchor member or stationary member, illustrated generally by the numeral 30, has a body portion 32 which overlies the panel 14 or flanged member 24. One end of the body 32 is formed to a U shape, as at 34, which extends over the flange 22. Barbs 36 may be formed, as in the outward leg of the U portion 34, which bite into the flange 22 to prevent removal of the anchor member 30 from the flange 22.

The opposite end of the body 32 is provided with a reversely bent portion 38. This portion includes an upstanding wall 40 which is generally perpendicular to the body 32. Wall 40 is provided with a suitable slot 42, the purpose of which will be later described. Extending from wall 40 is a terminal portion 43 which extends toward the body 32 at an angle with respect to the wall 40 and the body 32.

The insert member 44 of the fastening device is provided with a tongue portion 46 which is received in the slot 42 of the wall 40. The height of tongue 46 is slightly larger than the opening between the terminal edge of the portion 44 and the upper surface of the body 32, such that the terminal edge of the portion 44 will bite into the tongue portion 46 and prevent its removal. The end 48 of tongue 46 may be inclined, as illustrated in FIGURE 3, to facilitate entry into the slot 42 and passage between the portion 43 and the surface of the body 32. At the opposite end of insert member 44 is an enlarged head 50 which is receivable in the ornamental molding strip 20 and engages the inner surfaces of the lips 26 and 28. It is seen that as the insert member 44, with the ornamental molding strip 20 received therein, is inserted into the stationary portion or anchor member 30, the molding strip 20 will be clamped between the head 50 of the insert member 44 and the weatherstrip 18 and support 14. The ornamental molding strip 20 will thus be securely retained in place.

Head 50 may be provided with slots 52 extending longitudinally thereof, which permit a slight tensioning of the tongue 46 with respect to the remainder of the head 50. This provides a more secure and positive attachment of the molding strip and a slight degree of resilience to protect the assembly.

Insert member 44 may be formed of any suitable material, and for illustration purposes is shown as being of a plastic. This may be nylon, polypropylene, or the like, so long as the material is not as hard as the material of which anchor member 30 is formed. This permits the terminal portion 43 of anchor member 30 to bite into the tongue 46 and retain the insert member 44 and molding strip 20 in place.

Thus, a fastening device is provided which will securely mount a molding strip in place adjacent a flanged support. The insert portion may be placed in the molding strip prior to the assembly procedure and merely pressed into place in the anchor portion secured to the flange adjacent the window.

What is claimed is:

1. Molding fastener means for securing a molding strip to a support having a flange and comprising:
   an anchor member having a body and means formed thereon for securing said anchor member to said flange;
   the outer end of said anchor member being formed to provide a wall extending at substantially right angles to the body of said anchor member and to provide a terminal edge angularly disposed with respect to said wall, said wall having a slot formed therein;
   and an insert member having an enlarged head and a tongue extending therefrom, said tongue being receivable in said slot and engageable with said terminal edge of said anchor member, said terminal edge being adapted to bite into said tongue and prevent removal from said anchor member, said head being receivable in said molding strip for securing said molding strip to said support.

2. Molding fastener means for securing a molding strip to a support having a flange thereon and comprising:
   an anchor member having a body adapted to overlie said support, said body terminating at one end in a U-shaped portion extending over said flange and having tab means formed therefrom to bite into said flange, the other end of said body terminating in a reversely bent portion having an intermediate part thereof generally parallel to said flange and having a slot formed therein;
   and an insert member having an elongated tongue and an enlarged head, said tongue being receivable in said slot in said anchor member and said head engaging a molding strip and retaining said molding strip on said support, said tongue being secured in said anchor member by said reversely bent portion.

3. A molding installation comprising:
   a supporting panel having a flange extending therefrom;
   an anchor member received over said flange and overlying said panel, said anchor member having tabs formed therefrom adapted to bite into said flange to retain said member on said flange and said anchor member having a reversely bent portion spaced from said flange engaging portion having a slot formed therein;
   a member overlying said anchor member and adjacent said flange;
   an insert member having a tongue received in said slot in said anchor member and having an enlarged head at the end of said tongue;
   and a molding strip having inturned longitudinal flanges received over said head of said insert member and clamped between said supporting panel, said member overlying said anchor member and said head on said insert member.

4. A windshield reveal molding assembly comprising:
   a supporting panel having a flange extending therefrom;
   a windshield disposed adjacent said supporting panel and generally parallel to said flange;
   weatherstrip means disposed between said supporting panel and said windshield;
   an anchor member having a body lying between said supporting panel and said weatherstrip means, said body having a U-shaped portion at one end received over said flange and secured thereto, said body having a reversely bent portion at the other end having a slot formed therein;
   an insert member having a tongue extending into said slot in said anchor member and an enlarged head at the outer end thereof;
   and a molding strip having longitudinal flanges extending along the length thereof and received over said head of said insert member, said molding strip being clamped into engagement with said supporting panel and said weatherstrip means by said insert member, said insert member being retained in said anchor member by said reversely bent portion.

References Cited in the file of this patent

UNITED STATES PATENTS 2,794,218     Ramsay _____ June 4, 1957

FOREIGN PATENTS 145,757     Australia _____ Mar. 14, 1952
210,043     Australia _____ Sept. 5, 1957